United States Patent
Park

(10) Patent No.: US 11,104,005 B2
(45) Date of Patent: Aug. 31, 2021

(54) CONTROLLER FOR END PORTION CONTROL OF MULTI-DEGREE-OF-FREEDOM ROBOT, METHOD FOR CONTROLLING MULTI-DEGREE-OF-FREEDOM ROBOT BY USING CONTROLLER, AND ROBOT OPERATED THEREBY

(71) Applicant: NEUROMEKA, Seoul (KR)

(72) Inventor: Jong Hoon Park, Namyangju-si (KR)

(73) Assignee: NEUROMEKA, Seoul (KR)

( * ) Notice: Subject to any disclaimer, the term of this patent is extended or adjusted under 35 U.S.C. 154(b) by 375 days.

(21) Appl. No.: 16/307,472

(22) PCT Filed: Oct. 31, 2016

(86) PCT No.: PCT/KR2016/012401
§ 371 (c)(1),
(2) Date: Dec. 5, 2018

(87) PCT Pub. No.: WO2017/217610
PCT Pub. Date: Dec. 21, 2017

(65) Prior Publication Data
US 2019/0217480 A1 Jul. 18, 2019

(30) Foreign Application Priority Data

Jun. 17, 2016 (KR) .................. 10-2016-0076063
Oct. 28, 2016 (KR) .................. 10-2016-0142214

(51) Int. Cl.
*B25J 13/06* (2006.01)
*B25J 9/16* (2006.01)
(52) U.S. Cl.
CPC .............. *B25J 13/06* (2013.01); *B25J 9/16* (2013.01); *B25J 9/1664* (2013.01)

(58) Field of Classification Search
CPC .................................. B25J 13/06; B25J 9/16
See application file for complete search history.

(56) References Cited

U.S. PATENT DOCUMENTS 5,128,671 A * 7/1992 Thomas, Jr. ............ A63F 13/06
341/20
6,385,508 B1 5/2002 McGee et al.
(Continued)

FOREIGN PATENT DOCUMENTS

EP       1724072 A1    11/2006
JP   H06250728 A     9/1994
(Continued)

OTHER PUBLICATIONS

Hector et al. "Distributed rotational and translational maneuvering of rigid formations and their application"; 14 pages (Year: 2016).*
(Continued)

*Primary Examiner* — Kira Nguyen

(57) ABSTRACT

One aspect of the present invention provides a robot controller for end portion control of a multi-degree-of-freedom robot. The robot controller comprises: a first control interface, which is positioned at a first position around the robot end portion and receives a first control input for at least for directions; a second control interface, which is positioned at a second position around the robot end portion and receives a second control input for at least four directions; and an encoder, which interprets the combination of the first and second control inputs as a third control input about the robot end portion and provides the robot with a signal according to the third control input.

19 Claims, 11 Drawing Sheets

(56) References Cited

U.S. PATENT DOCUMENTS

| | | | |
|---|---|---|---|
| 9,993,307 B2* | 6/2018 | Lohmeier | A61B 46/10 |
| 2006/0178775 A1 | 8/2006 | Zhang et al. | |
| 2007/0282228 A1* | 12/2007 | Einav | A63B 21/00178 |
| | | | 601/33 |
| 2008/0255704 A1 | 10/2008 | Braut | |
| 2009/0289591 A1* | 11/2009 | Kassow | B25J 18/00 |
| | | | 318/568.13 |
| 2010/0196210 A1* | 8/2010 | Jungheim | B01L 3/0275 |
| | | | 422/526 |
| 2015/0081097 A1 | 3/2015 | Som | |
| 2015/0290796 A1 | 10/2015 | Iwatake | |
| 2016/0031089 A1 | 2/2016 | One et al. | |

FOREIGN PATENT DOCUMENTS

| | | |
|---|---|---|
| JP | 2004-223663 A | 8/2004 |
| JP | 2014-117783 A | 6/2014 |
| KR | 1019990044591 A | 6/1999 |
| KR | 1020140148471 A | 12/2014 |
| KR | 1020150106927 A | 9/2015 |
| KR | 1020150129172 A | 11/2015 |
| WO | 1997/10080 A1 | 3/1997 |

OTHER PUBLICATIONS

Extended European Search Report dated May 13, 2020 in counterpart European Application No. 16905594.4 (13 pages in English).
Office Action for European Application No. 16905594.4, dated May 3, 2021.
Talvas Anthony et al., "A Survey on Bimanual Haptic interaction", IEEE Transactions On Haptics, IEEE, USA., vol. 7, No. 3, Jul. 1, 2014, pp. 285-300.

* cited by examiner

CONTROLLER FOR END PORTION CONTROL OF MULTI-DEGREE-OF-FREEDOM ROBOT, METHOD FOR CONTROLLING MULTI-DEGREE-OF-FREEDOM ROBOT BY USING CONTROLLER, AND ROBOT OPERATED THEREBY

CROSS-REFERENCE TO RELATED APPLICATIONS

This application is a national stage of International Application No. PCT/KR2016/012401, filed 31 Oct. 2016, which claims the benefit of priority to Korean Applications No. 10-2016-0076063, filed on 17 Jun. 2016 and No. 10-2016-0142214, filed on 28 Oct. 2016 in the Korean Intellectual Property Office, the disclosures of which are incorporated herein by reference.

BACKGROUND OF THE INVENTION

Field of the Invention

The present invention relates to a robot controller and, more specifically, to a robot controller for delivering an accurate path to a robot.

This work was partly supported by Korea Evaluation Institute of Industrial Technology's (KEIT) grant funded by the Korea government (MOTIE) (No. 10060121, Development of Reconfigurable Articulated Robot Manipulators and All-in-One Motion Control System for Manufacturing of Mobile IT Products).

Related Art

A conventional device for teaching robot motion determines a robot path by using a Force/Torque (F/T) sensor and admittance control. Suppose a user programs a robot by using a teaching method based on the conventional F/T sensor. In this case, when the user applies a force along the x-axis, a small amount of force is also exerted on the y-axis or z-axis, causing a problem of not being able to deliver user-intended accurate path information to the robot. Also, for the same reason, it is difficult to deliver the robot position desired by the user to the existing path of the robot in a natural manner.

SUMMARY OF THE INVENTION

To solve the problem above, the objectives of the present invention are to provide a controller for controlling the end portion of a multi-degree-of-freedom robot that determines direction by using two control interfaces and delivers a signal to the robot by recognizing an operator's intention accurately through impedance control, a control method using the mentioned controller, and a robot operated by this method.

To achieve the object above, a robot controller for controlling an end portion of a multi-degree-of-freedom robot according to one aspect of the present invention may comprise a first control interface which is positioned at a first position around the robot end portion and receives a first control input for at least four directions; a second control interface which is positioned at a second position around the robot end portion and receives a second control input for at least four directions; and an encoder which combines the first and second control inputs so as to interpret the combination of the first and second control inputs as a third control input about the robot end portion and provides the robot with a signal according to the third control input.

The signal according to the third control input is a signal instructing a rotational or translational motion corresponding to the third control input, and the robot can exclude an external force not related to the rotational or translational motion corresponding to the third control input among external forces applied to the robot end portion by the signal according to the third control input.

The robot controller may further include a rotating disk for adjusting the angle of direction in which the robot end portion makes a translational motion.

The robot controller may further include a motor that provides predetermined rotational resolution when the rotating disk is rotated.

The robot controller may further include a position sensor that senses the position of the motor, and the robot is controlled based on control signal information according to the third control input and position information of the motor through the position sensor.

The robot controller may further include a storage that stores at least one of control signal information according to the third control input or position information of a motor through the position sensor, and direct teaching may be performed based on the information stored in the storage.

The first and the second control interfaces may be positioned on the rotating disk.

The direction in which the robot end portion makes a translational motion may be determined based on the positions of the first and the second control interfaces on the rotating disk.

In the 3-dimensional space expressed in terms of x-, y-, and z-axis, when the first and the second control inputs are inputs of the same direction on the same axis, the encoder may interpret the control inputs as a translational motion along the input direction.

In the 3-dimensional space expressed in terms of x-, y-, and z-axis, when the first and the second control inputs are inputs on the opposite direction to each other on the same axis, the encoder may interpret the control inputs as a rotational motion about the axis orthogonal to that axis.

The robot controller may further include a fastening part that couples and encloses the robot end portion and this fastening part may be used to attach or detach the controller to the robot end portion.

At least one of the first or the second control interfaces may comprise at least one of a button, switch, joystick, or touch screen for the control input for four directions at least.

At least one of the first or the second control interfaces may further include a button for motion control of an end effector.

The first and the second control interfaces may be disposed at the positions facing each other.

The first and the second control interfaces may be disposed being apart from each other within a distance for one-hand control.

When a control input is applied on a first axis in the 3-dimensional space expressed in terms of x-, y-, and z-axis, the robot controller may further include a controller that provides a control algorithm based on impedance control to prevent a force or moment from being applied to other axis excluding that axis.

When a control input is applied to the plane formed by the first and the second axis in the 3-dimensional space, the control algorithm may include an algorithm that excludes a force or moment along a third axis other than the force or moment applied on the plane formed by the first and the second axis.

When a control input related to rotation of the robot end portion is applied, the control algorithm may include an algorithm which excludes a force or moment related to the translational motion of the robot end portion in the 3-dimensional space.

To achieve the object above, a method for controlling a multi-degree-of-freedom robot by using a robot controller according to another aspect of the present invention may comprise receiving a first control input for at least four directions from a first control interface positioned at a first position around a robot end portion; receiving a second control input for at least four directions from a second control interface positioned at a second position around the robot end portion; combining the first and the second control inputs so as to interpret the combined first and the second control inputs as a third control input about the robot end portion; and providing the robot with a signal according to the third control input.

To achieve the object above, a multi-degree-of-freedom robot according to a yet another aspect of the present invention may comprise a robot controller controlling motion of the robot and at least one robot arm moving according to the control of the robot controller, wherein the robot controller may comprise a first control interface which is positioned at a first position around a robot end portion and receives a first control input on at least four directions; a second control interface which is positioned at a second position around the robot end portion and receives a second control input on at least four directions; and an encoder which interprets the combination of the first and second control inputs as a third control input about the robot end portion and provides the robot with a signal according to the third control input.

According to the controller for controlling a robot end portion of a multi-degree-of-freedom robot, control method by using the controller, and robot operated by the method of the present invention, the intention of a user for a desired robot motion can be delivered more clearly, and thereby the trajectory of the robot end portion may be derived accurately.

Also, according to the controller for controlling a robot end portion of a multi-degree-of-freedom robot, control method by using the controller, and robot operated by the method of the present invention, the user is enabled to control the robot end portion in an intuitive manner, which improves user convenience.

DESCRIPTION OF EXEMPLARY EMBODIMENTS

Figure 1A:
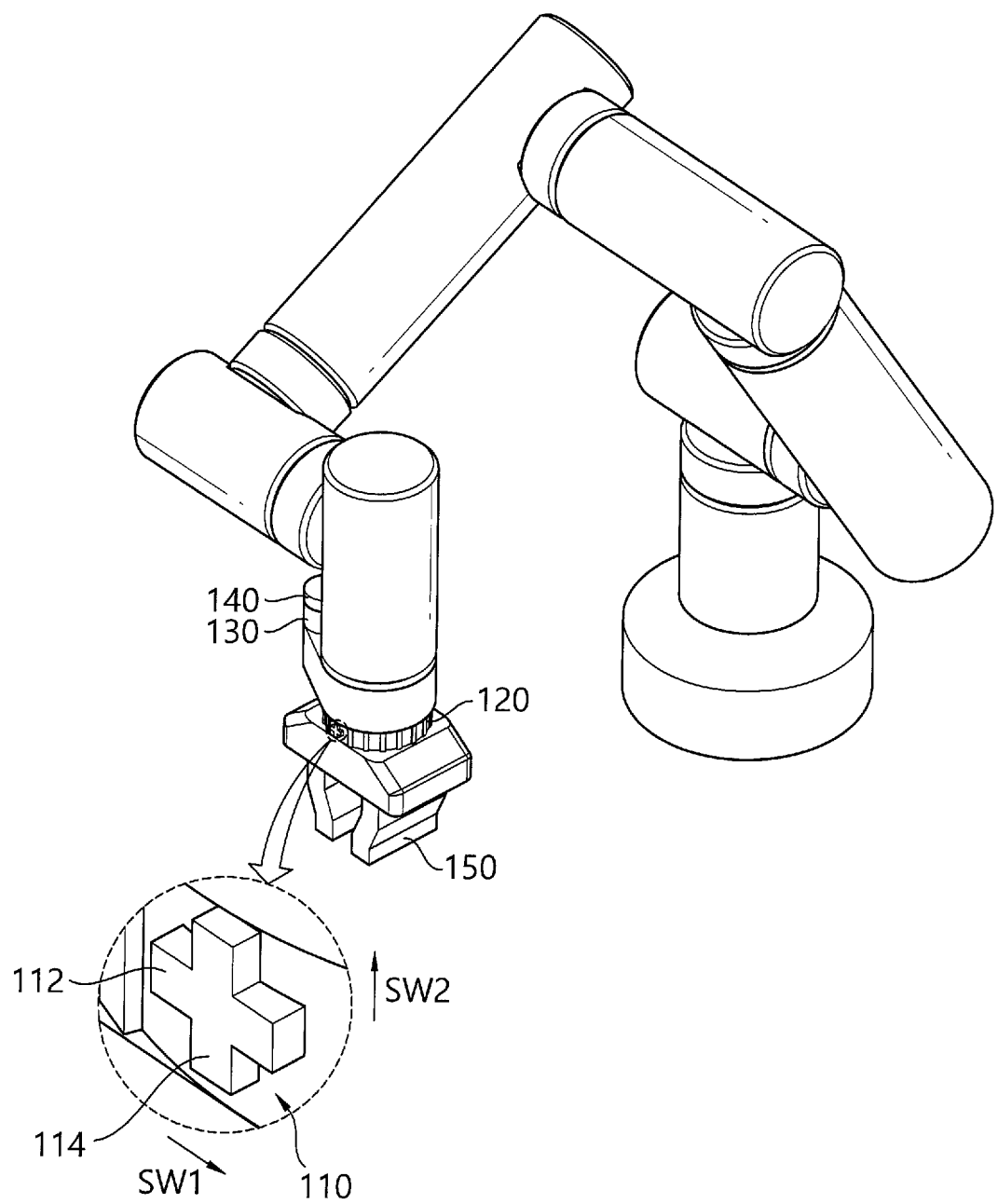
FIG. 1a is a perspective view of a robot including a robot controller according to one embodiment of the present invention.

The embodiments of the present invention may be modified in various and implemented in various other forms; therefore, specific embodiments will be described in detail with reference to appended drawings.

However, it should be understood that the appended drawings are not intended to limit the present invention to the specific embodiments; rather, it should be understood that the appended drawings include all of the modifications, equivalents or substitutes described by the technical principles and belonging to the technical scope of the present invention.

The terms such as first or second may be used to describe various constituting elements of the present specification, but the constituting elements should not be limited by the terms. Those terms are used only for the purpose of distinguishing one constituting element from the others. For example, without departing from the technical scope of the present invention, a first constituting element may be called a second constituting element and vice versa. The term and/or includes a combination of a plurality of related elements or any one of a plurality of related elements.

If a constituting element is said to be "connected" or "attached" to other constituting element, the former may be connected or attached directly to the other constituting element, but there may be a case in which another constituting element is present between the two constituting elements. On the other hand, if a constituting element is said to be "directly connected" or "directly attached" to other constituting element, it should be understood that there is no other constituting element between the two constituting elements The terms used in the present specification have been introduced only to describe specific embodiment and should not be understood as restricting the technical scope of the present invention. A singular expression should be understood to indicate a plural expression unless otherwise explicitly stated. The term of "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

Unless defined otherwise, all of the terms, including technical or scientific ones, used in this document provide the same meaning as understood generally by those skilled in the art to which the present invention belongs. Those terms defined in ordinary dictionaries should be interpreted to have the same meaning as conveyed by a related technology in the context. And unless otherwise defined explicitly in the present invention, those terms should not be interpreted to have ideal or excessively formal meaning.

In what follows, preferred embodiments of the present invention will be described in detail with reference to appended drawings. In describing the present invention, in order to facilitate the overall understanding, the same reference symbols are used for the same constituting elements of the drawings, and repeated descriptions of the same constituting elements will be omitted.

FIG. 1a is a perspective view of a robot including a robot controller according to one embodiment of the present invention. As shown in FIG. 1a, a robot including a robot controller according to one embodiment of the present invention may include a control interface 110, rotating disk 120, motor 130, encoder 140, and end effector 150.

Referring to FIG. 1a, a robot according to one embodiment of the present invention may include a plurality of robot arms, and each robot arm is capable of rotation and translation motion along various axes to perform multi-degree-of-freedom motions in the 3-dimensional space formed by x, y, and z-axes. The multi-degree-of-freedom motions may be implemented through a main controller (not shown) of the robot.

In one embodiment of the present invention, the robot controller provides a control input for the robot through communication in a wired or wireless manner with a main controller that supervises the overall motion of the robot. The robot controller may include a control interface 110, rotating disk 120, motor 130, and encoder 140. The robot controller may be a controller that supports to control the robot intuitively through a control input device such as the control interface 110 and to perform direct teaching for the robot. Since the control interface 110 according to one embodiment of the present invention is used for robot teaching, it may be called a "teaching interface".

The control interface 110, which includes at least two switches 112, 114 for direction control, controls the motion of a robot end portion (for example, which may indicate the robot arm at the farthest end portion). The control interface 110 is disposed in pairs, being separated from each other on the rotating disk 120 but more preferably disposed at the positions facing each other to receive the control input from the user. At this time, one pair of control interfaces 110 may be disposed within a distance for one-hand control for the convenience of manipulation of the user. In other words, it is preferred to dispose the control interfaces to face each other with a distance shorter than one hand length.

The first switch 112 of the control interface 110 enables a bidirectional motion along one of the x-, y-, and z-axis, and the second switch 114 enables a bidirectional motion along the axis orthogonal to one axis related to the first switch 112. In other words, the first 112 and the second switch 114 may receive a control input for at least four directions of front, rear, up, and down directions. The user may enter at least two control inputs for up, down, left, and right directions received through two control interfaces 110 at positions facing each other, through which the user makes the robot end portion perform a multi-degree-of-freedom motion. In other words, through the control interface 110, direction of a motion may be determined, and the user's intention may be identified accurately through impedance control to be described later, by which a control signal related to the identified intention may be provided to the robot. In other words, instead of identifying the user's intention for manipulation rather ambiguously by inaccurate sensing of a force and/or moment from the user's pushing motion through an F/T sensor, a control input applied to at least one axis in the 3-dimensional space that the user actually enters through the control interface 110 may be identified and delivered to the robot without ambiguity. Then by using the identified control input, the user applies a physical force in the direction of a translational motion together with a control input of the control interface 110 for the translational motion so that the robot end portion may move. In other words, in the impedance control, the control input for translational motion generated through the control interface 110 reduces an impedance parameter including elastic coefficient in the corresponding direction, thereby releasing the motion constraint only in the direction of the corresponding axis. According to the principle above, when the user does not apply a force directly to the robot end portion, the robot end portion does not move even if the user selects the axis along which to move the robot end portion (it indicates the axis along which the motion constraint is to be released) through a control input for translational motion. Also, if the axis along which to move the robot end portion is not selected as the user did not enter a control input for translational motion, the robot enters a default impedance state, the elastic coefficient becomes high for all of the directions of the robot, and therefore, the robot end portion does not move even if the user exerts a force thereto.

In other words, when the user applies a force while a control input for translational motion has been input through the control interface 110, the translational motion is performed in the direction intended by the user, namely, in the direction along the axis set through the rotating disk 120. By the impedance control, the robot does not respond to the force in the direction other than the direction of the set axis. Accordingly, the robot may be controlled and taught precisely according to the user's intention.

To determine the direction of translational motion, the user may rotate the rotating disk 120. The user may also rotate the rotating disk 120 by applying a physical force.

Moreover, by inputting a control command for rotational motion through the control interface 110, the user may deliver his or her intention to perform rotation of the robot end portion. In other words, through the rotation control input, operation other than the force to rotate the robot end portion may be set impossible to be performed, but the robot end portion is allowed to be rotated due to the force applied by the user for rotation of the robot end portion. In other words, a motion related to the translation of the robot end portion in the 3-dimensional space is excluded.

Also, in addition to the above, the control interface 110 may provide an orientation command and other various commands based on the orientation command.

The rotating disk 120 may be disposed between the robot arm at the end portion and the end effector 150. The rotating disk 120 may rotate according to the orientation operation performed by the user and determine the direction of translational motion in response to the control input for the translational motion through the control interface 110. In other words, the rotating disk 120 may determine the direction of translational motion of the robot end portion according to the position of the rotating disk 120 in conjunction with the axis for the translational motion. In other words, the rotating disk 120 may be regarded as forming the same role as the handle of a bicycle. In other words, by rotating the rotating disk 120, the axis for the translational motion is set up, and the robot is prepared for the translational motion. At this time, the direction of the translational motion may be associated with the position of the control interface 110 disposed on the rotating disk 120. In other words, the robot end portion may be moved along the direction of a line connecting the control interfaces 110 facing each other or may be moved along the direction normal to the line. The actual motion may be changed through the setting by the user.

Also, the rotating disk 120 rotates according to predetermined, rotation-related resolution. Here, the resolution indicates the amount of angles rotated in response to the user's operation for a single rotational motion (for example, 3 degrees). The resolution may be changed arbitrarily by the user through a user interface (not shown).

The motor 130 provides the resolution for rotational motion to the rotating disk 120. The motor 130 may include a servo motor or a step motor. The motor 130 may provide the rotational resolution directly to the rotating disk 120 or may be engaged with an upper axis connected to the rotating disk 120 to provide the rotational resolution to the rotating disk 120. The motor 130 is configured to rotate as much as the resolution angle per rotational operation set by the user.

The encoder 140 combines the first and the second control input received respectively from a pair of control interfaces 120 and interprets the combination as a rotational motion control input or a translational motion control input for the robot end portion. Then the encoder 140 encodes the interpreted control input into a signal and provides the encoded signal to the main controller of the robot. Through this operation, a rotational motion for the robot end portion and/or a translational motion with respect to a reference axis for the translational motion based on the rotating disk 120 may be performed.

The end effector 150 includes a gripper or an electrical structure related thereto. The end effector 150 is not necessarily related to the example above but may be implemented by using other types of devices such as a welding torch, spray gun, or nut runner depending on a given robot task.

Figure 1B:
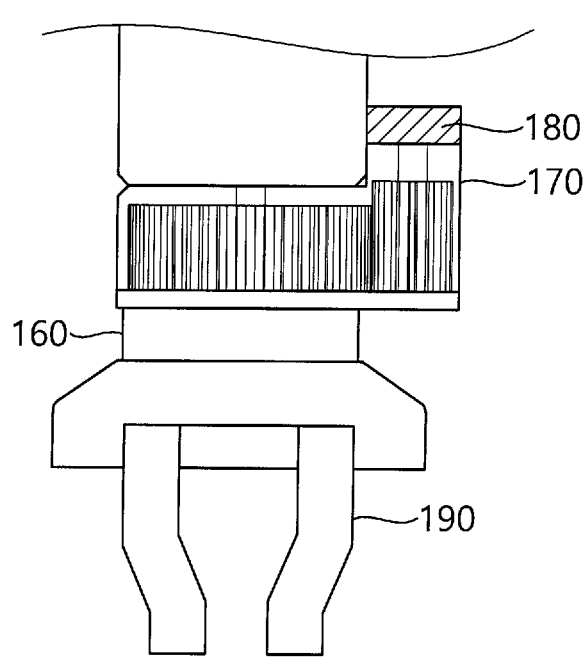
FIG. 1b is a cross-sectional view of a robot including a robot controller according to one embodiment of the present invention.

FIG. 1b is a cross-sectional view of a robot including a robot controller according to one embodiment of the present invention. As shown in FIG. 1b, a robot including a robot controller according to one embodiment of the present invention may include a rotating disk 160, motor 170, encoder 180, and end-effector 190.

Referring to FIG. 1b, the rotating disk 160 is disposed between the robot arm and the end effector 190. The axis of the rotating disk 160 may differ from that of the end effector 190. The rotating disk 160 may operate in conjunction with a rotational motion providing portion which includes an axis for providing a rotational motion to the upper portion, and the rotational motion providing portion may be engaged with the motor 180 to make the rotating disk 160 rotate as much as the rotational resolution predetermined by the rotation operation of the user.

According to an embodiment of the present invention, the encoder 180 may include a sensor (not shown) which detects the position of the motor. The sensor detects the angular position of a reference axis of the rotating disk 160 and the angular position related to the rotated angle of the corresponding motor. The encoder 180 may provide the motor position detected by the sensor to the robot main controller (not shown).

According to one embodiment of the present invention, at least one of the robot controller or the robot stores control input information interpreted by the encoder 180 or control signal information according to the interpreted information to a storage (not shown). When the information is stored in the storage, time-dependent information (for example, motion sequence information) may also be stored, which is used to identify in which order the control input has been received, which amount of angles the rotating disk has rotated in response to the position information of the rotating disk or motor at the time the control input is received, and in which direction a translational motion has been performed. From the identified information, direct teaching may be achieved.

Figure 2:
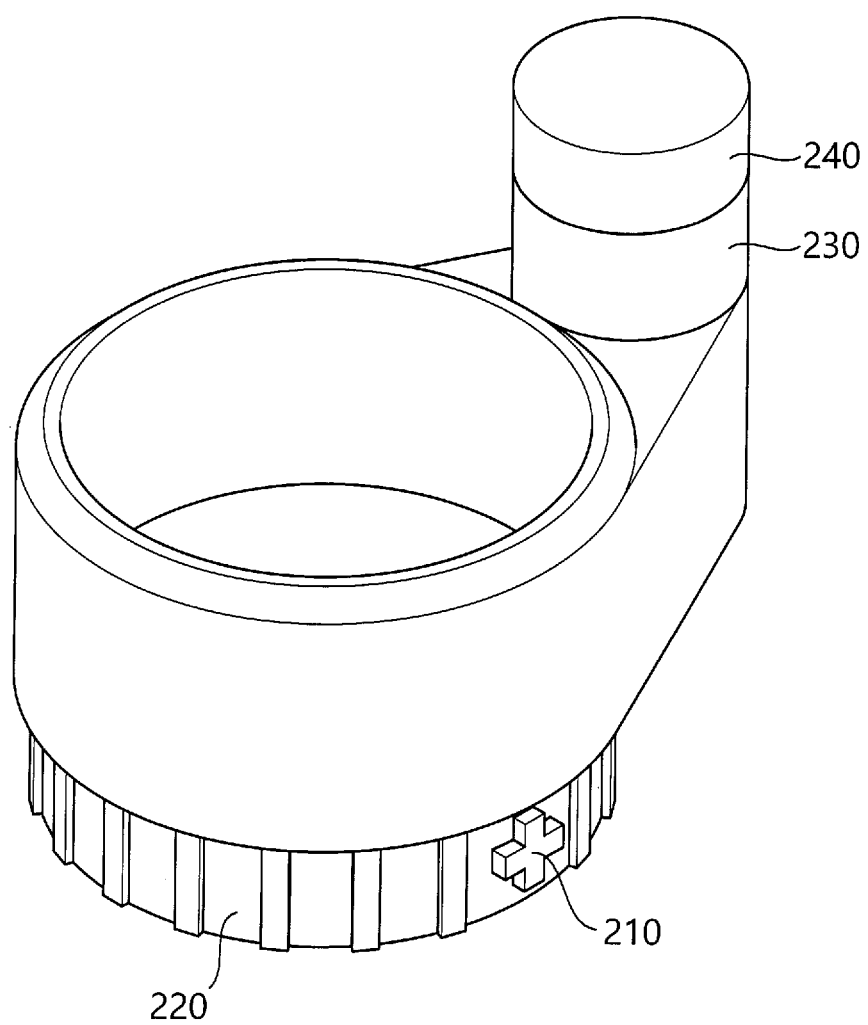
FIG. 2 illustrates a robot controller according to one embodiment of the present invention.

FIG. 2 illustrates a robot controller according to one embodiment of the present invention. As shown in FIG. 2, a robot controller according to one embodiment of the present invention may include at least two control interfaces 210, rotating disk 220, motor 230, and encoder 240.

Referring to FIG. 2, one pair of control interfaces 210, rotating disk 220, motor 230, and encoder 240 may perform the same roles as the control interfaces, rotating disk, motor, and encoder of FIGS. 1a and 1b.

According to an embodiment of the present invention, the robot controller may be built in the form of a detachable module as shown in FIG. 2 to be installed in a detachable manner to a general-purpose robot. At this time, it is preferable that the rotating disk 220 is disposed between the end effector and the robot arm, and the structure of the robot controller may be implemented so that the robot arm and the end effector may be fastened to each other with tension through a timing belt and tensioner, pulley, bushing, and the like.

Figure 3A:
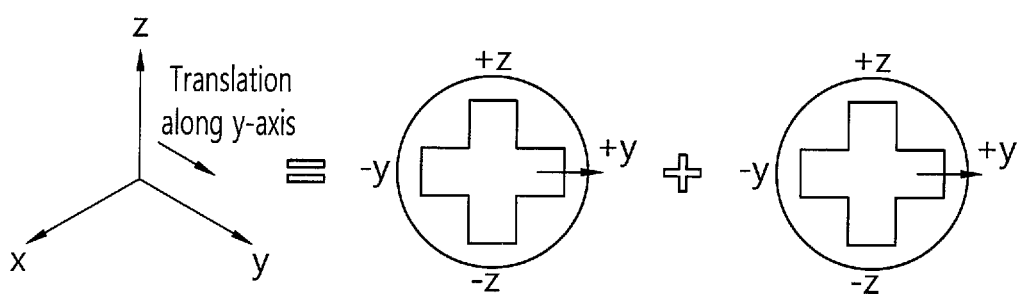
FIG. 3a illustrates a method for manipulating a translational motion of a robot controller according to one embodiment of the present invention.

FIG. 3a illustrates a method for manipulating a translational motion of a robot controller according to one embodiment of the present invention.

Referring to FIG. 3a, the encoder may interpret the control input of the first and the second control interfaces as a translational motion command. Such an interpretation is performed when the control input is applied in the same direction about the same axis. For example, as shown in the embodiment of FIG. 3a, if the first and the second control interfaces provide a control input in the +y direction with respect to the same y-axis, the encoder may receive two control inputs in the +y direction and interpret the control inputs as a translational motion command in the +y direction along the y axis. The user may apply two control inputs in the +y direction, and the control interfaces may remove movements other than the motion in the +y direction, receive a force from the user, respond only to the force applied in the +y direction, and make the robot end portion perform a translational motion precisely in the +y direction.

At this time, the direction of the translational motion in the +y direction may be determined by the rotation angle of the rotating disk. In this context, when both of the first and the second interfaces provide a control input in the +z direction, the encoder may provide a command for a translational motion in the +z direction to the robot.

According to another embodiment of the present invention, a combination of control inputs for determining a translational motion as described above is not necessarily limited to the aforementioned case but may be freely modified according to the user settings. For example, when a motion in the + direction is received along different axes, a command for a motion in a specific direction by as much as a predetermined amount of angles with respect to the rotating disk may be performed. In other words, if +y and +z control inputs are received, a motion in the +y direction at an orientation of 45 degrees may be configured to be performed.

In the embodiment of the present invention, since the control interface is capable of providing control inputs only for four directions, it is difficult to completely reconstruct a 6 degree-of-freedom motion. Therefore, the robot controller is operated as a kind of non-holonomic system. According to this principle, it is preferable that one of the two switches of the control interface is related to a motion in the vertical direction while the other one is related to a motion in the horizontal direction.

According to yet another embodiment of the present invention, to overcome the limitation of a non-holonomic system, when an input is applied to one of the control interfaces, a motion may be set in such a way to be performed along the remaining one axis (x-axis in the case of the present embodiment) which does not provide a motion due to the current user setting. For example, if an input is received in the −y axis direction only through the first control interface but no input is received through the second control interface, it may be interpreted as a translational motion in the −x axis. Similarly, if an input is received in the +y axis only through the first control interface but no input is received through the second control interface, it may be interpreted as a translational motion in the +x axis. If the aforementioned interpretation is extended, the case where an input is received only through the first control interface and the case where an input is received only through the second control interface may be set to be controlled separately and differently.

Figure 3B:
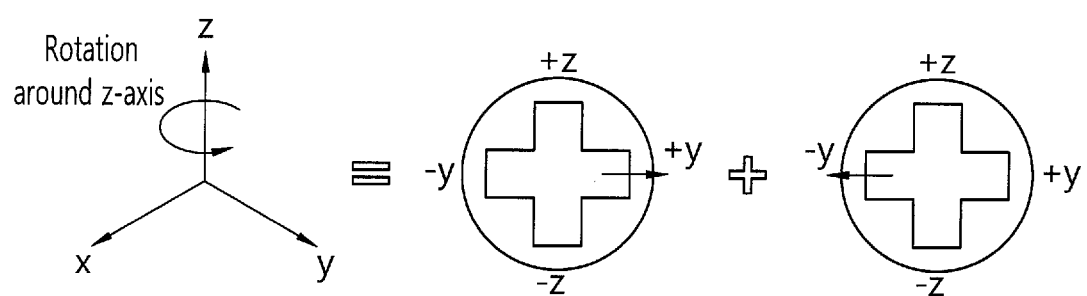
FIG. 3b illustrates a method for manipulating a rotational motion of a robot controller according to one embodiment of the present invention.

FIG. 3b illustrates a method for manipulating a rotational motion of a robot controller according to one embodiment of the present invention.

Referring to FIG. 3b, the encoder may interpret the control input of the first and the second control interfaces as a rotational motion command for the robot end portion. This interpretation is performed when control inputs in the opposite directions are applied to the same axis. For example, as in the embodiment of FIG. 3b, when the first and the second control interfaces provide control inputs in the +y and −y direction respectively to the same y-axis, the encoder may interpret the control inputs as a rotational command with respect to the z-axis orthogonal to the y-axis. Similarly, according to the control inputs to the first and the second control interfaces, direction of a rotational motion may be determined. For example, when the first control interface provides a +y direction input and the second control interface provides a −y direction input, a clockwise rotation may be set to be performed around the z-axis while, in case that the first control interface provides a −y direction input and the second control interface provides +y direction input, a counter-clockwise rotation may be set to be performed around the z-axis.

Figure 4:
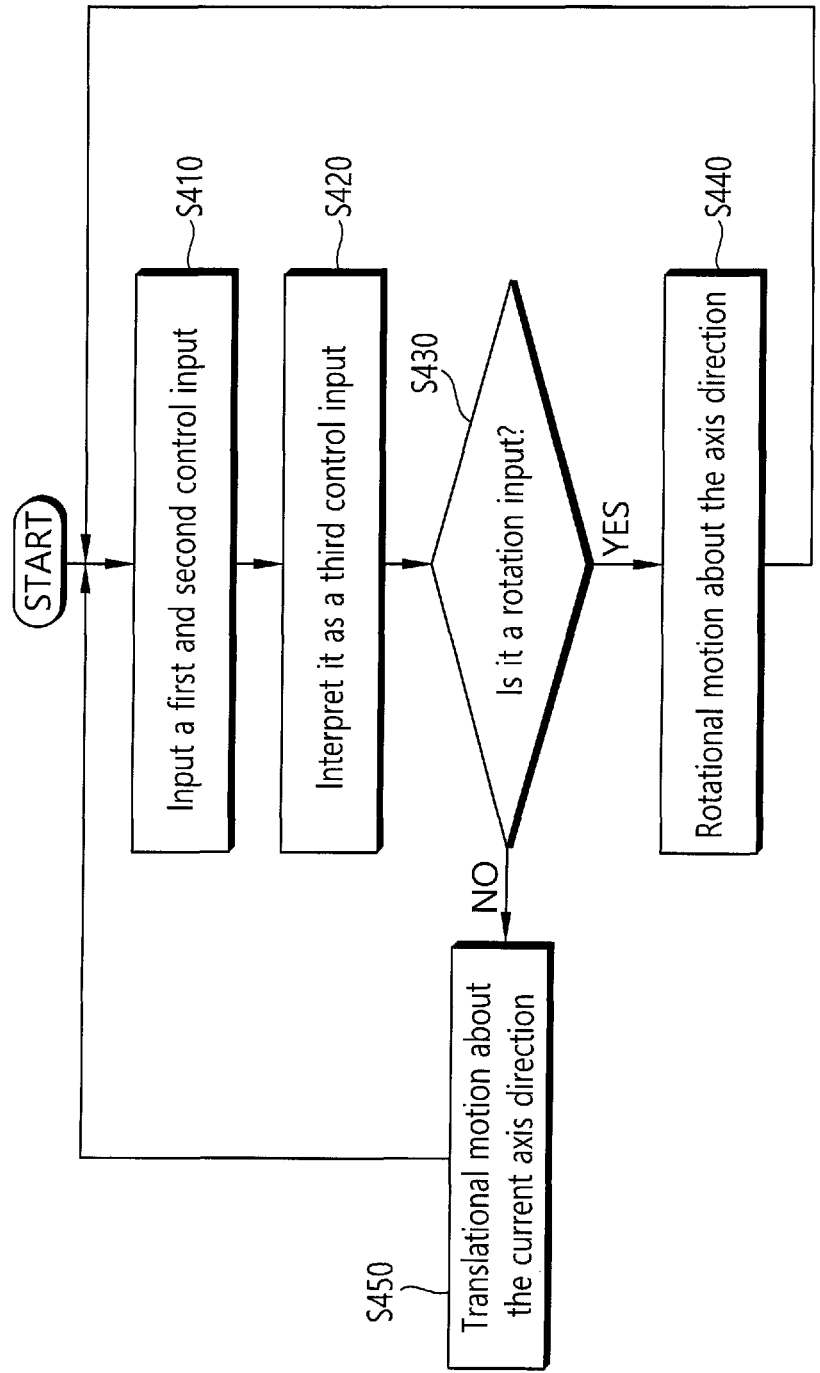
FIG. 4 is a flow diagram illustrating a method for operating a robot controller according to one embodiment of the present invention.

FIG. 4 is a flow diagram illustrating a method for operating a robot controller according to one embodiment of the present invention.

Referring to FIG. 4, a first and a second control input are received through a first and a second control interface (S410). The encoder combines the received first and second control inputs and interprets the combined inputs as a third control input (S420). At this time, interpretation as a third control input from a combination of control inputs refers to the descriptions of FIGS. 3a and 3b.

Then it is determined whether the third control input is a control input for a rotational motion or a control input for a translational motion (S430). If the third control input is determined as a control input for a rotational motion, an external force related to a translational motion is rejected so that the robot end portion may be rotated around the direction of the corresponding axis (S440). Accordingly, while a control input for a rotational motion is received, the robot end portion may be made to be rotated according to a physical force exerted by the user. Then the whole process returns to the initial state and waits for the next control input.

If the third control input is determined as a control input for a translational motion, the orientation angle of the axis directed by the rotating disk is detected through a position sensor, and a translational motion is performed according to a force exerted by the user in the direction of the axis at the orientation angle (S450). At this time, forces in all other directions other than the direction of the axis pointed by the rotating disk are canceled out by impedance control.

In the embodiment of the present invention, separately from the control input through the first and the second control interfaces, manipulation for a rotational motion by using the rotating disk may be performed directly by the user. According to the manipulation, a reference axis for a translational motion may be changed and in response to the physical force applied by the user in the direction of the reference axis, a translational motion may be performed in the direction of the corresponding axis in the response to the control input for a translational motion.

Figure 5:
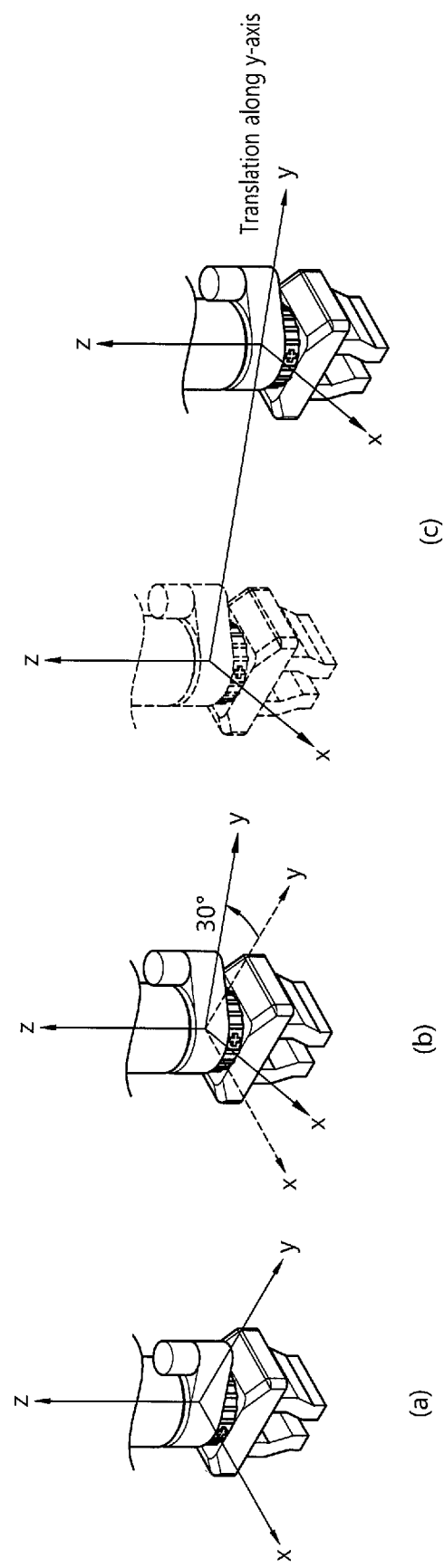
FIG. 5 illustrates a robot motion performing a translational motion in a direction desired by the user according to a control input through a robot controller according to one embodiment of the present invention.

FIG. 5 illustrates a robot motion performing a translational motion in a direction desired by the user according to a control input through a robot controller according to one embodiment of the present invention.

Referring to (a) of FIG. 5, with respect to the line formed by both of the control interfaces on the rotating disk, a specific axis (in the present embodiment, the vertical direction with respect to the line forms an axis) may be formed. At this time, when the user manipulates the rotating disk for a rotational motion, the rotating disk, motor, and the encoder may be rotated while the robot end portion is still kept to the original pose as shown in (b) of FIG. 5. At this time, the rotational motion is performed by the amount of rotational resolution of the rotating disk for a single rotational manipulation. For example, in the case of rotational resolution of 3 degrees, a rotation angle of 30 degrees may be obtained by performing the rotational manipulation 10 times. Obtaining the rotation angle as described above indicates that directions of the x- and y-axis for translational motion are changed.

After the user rotates the rotating disk to the orientation angle of the robot end portion desired by the user through a rotation manipulation on the rotating disk as described above, the user may select the direction for a forward movement and enter a command for a translational motion related to the selected direction. In other words, as shown in (c) of FIG. 5, after positioning the reference axis for translational motion to be aligned with the direction for the translational motion by rotating the rotating disk, the user may enter a control input of +y to both of the control interfaces so that the control input may be interpreted as a translational motion in the + direction along the same y-axis, by which the robot end portion may be made to perform the translational motion in response to the force exerted by the user in the +y direction.

Figure 6:
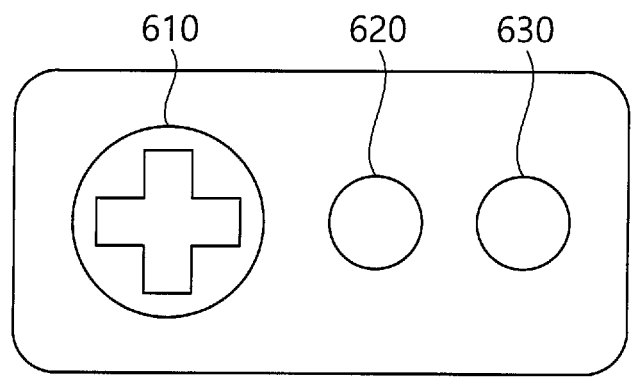
FIG. 6 illustrates a control interface including buttons for manipulating an end effector according to another embodiment of the present invention.

FIG. 6 illustrates a control interface including buttons for manipulating an end effector according to another embodiment of the present invention.

Referring to FIG. 6, the control interface may include at least two switches 610 and buttons 620, 630 for manipulation of the end effector. For example, if the end effector is a gripper, the button 620 may provide an input for a grasping motion whereas the button 630 may provide an input for a motion of releasing a grasped object.

Similarly, the control interface may provide an input for configuring waypoints required for direct teaching.

Also, when the end effector is not a gripper, for example, in the case of a welding torch, the button 620 may provide an input for combustion operation of the welding torch.

Figure 7:
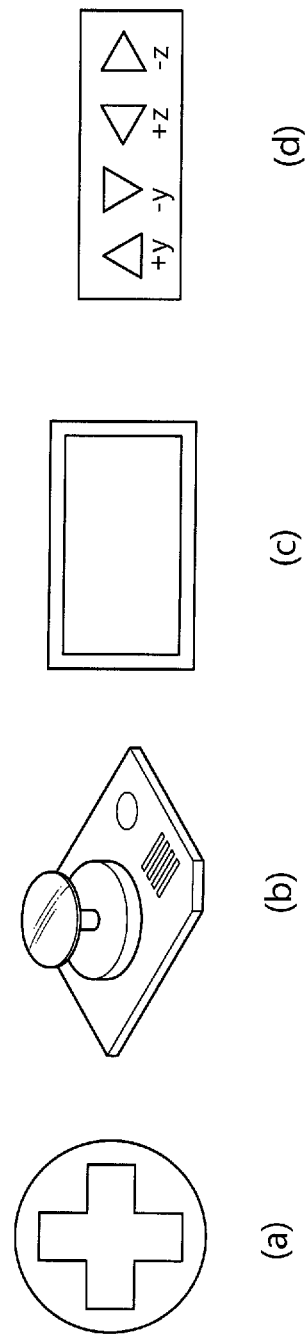
FIG. 7 illustrates examples of various interfaces which may be used for providing a control input to a robot controller according to one embodiment of the present invention.

FIG. 7 illustrates examples of various interfaces that may be used for providing a control input to a robot controller according to one embodiment of the present invention.

Referring to FIG. 7, the control interface may be implemented in various forms. As shown in (a) of FIG. 7, the control interface may be implemented in the form a '+' control pad; as shown in (b) of FIG. 7, the control interface may also be implemented in the form of a joystick.

According to another embodiment of the present invention, as shown in (c) of FIG. 7, the control interface may be implemented in the form of a touch panel, and as shown in (d) of FIG. 7, the control interface may be implemented in the form of a combination of buttons. In other words, as long as the control interface is able to receive an input for four directions, any kind of input mechanism may be utilized as the control interface of the present invention.

Figure 8A:
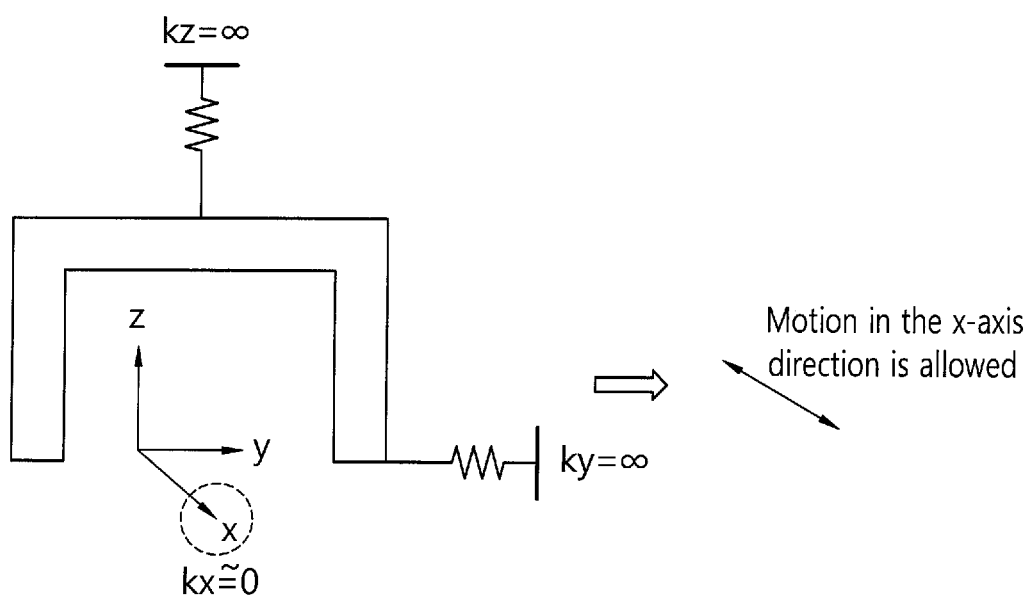
FIGS. 8a and 8b illustrate an impedance control algorithm for delivering the intention of the user about manipulation of a robot more clearly according to one embodiment of the present invention.
Figure 8B:
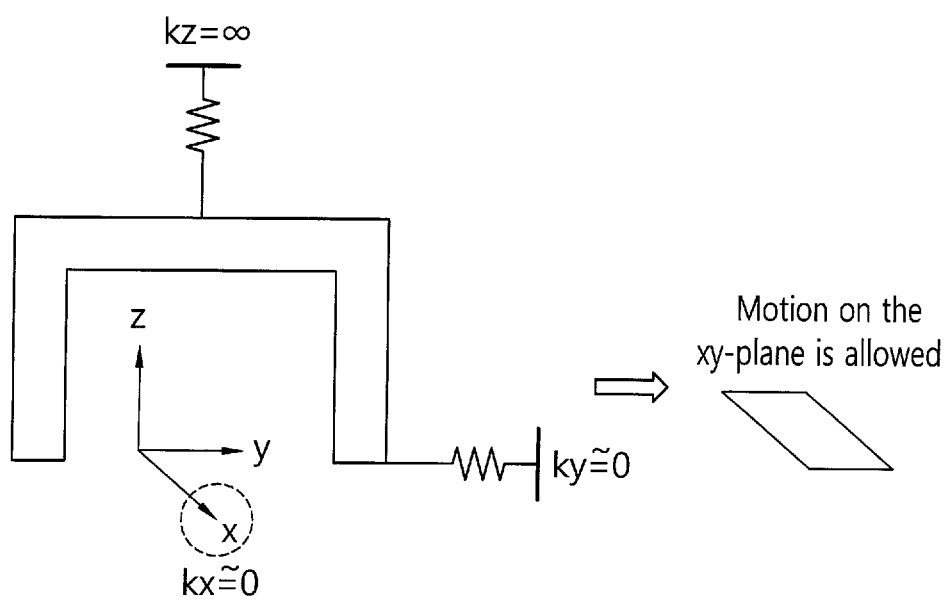

FIGS. 8a and 8b illustrate an impedance control algorithm for delivering the intention of the user about manipulation of a robot more clearly according to one embodiment of the present invention.

According to one embodiment of the present invention, since the robot controller is used for delivering the user's intention about robot manipulation clearly, a force or moment applied in the direction not related to the user's intention may have a critical influence on the resulting performance in using the robot controller. Therefore, it is necessary to exclude application of a force or moment not related to the user's intention about robot manipulation.

Referring to FIG. 8a, a virtual elastic force may be provided to at least parts of multiple joints participating in generating a motion of the robot arm to restrict a force from being applied in the x-, y-, and z-axis direction. These elastic forces may be controlled through a controller (not shown) including various control algorithms. The controller may be included in the robot controller or may be provided to the robot in the form of software together with the robot controller.

According to one embodiment of the present invention, when a control input is applied on the x-axis in the 3-dimensional space formed by x-, y-, and z-axis, the user's intention for robot manipulation may be delivered accurately only if the force or moment to other axes (for example, y- and z-axis) than the x-axis is excluded. In other words, when a control input is applied in the x-axis direction, the control algorithm may employ the impedance control method to increase the virtual elastic forces in the y- and z-axis direction to a significant level so that the force or moment in the y- and z-axis direction may be controlled not to affect the motion of the robot.

Referring to FIG. 8b, in another embodiment of the present invention, when a control input is received on the plane formed by x- and y-axis in the 3-dimensional space, the control algorithm may increase the virtual elastic force in the z-axis direction significantly to exclude a force or moment in the direction of one axis not related to the control input, namely z-axis. Through this operation, a motion in the z-axis direction may be excluded, and the user's manipulation along the x- and y-axis may be performed precisely.

In other words, application of a control algorithm for excluding a force or moment in the direction of a particular axis may be determined adaptively according to the control input of the user and may be actually performed.

Although the present invention has been described with reference to appended drawings and preferred embodiments given above, it should be understood by those skilled in the art that the present invention is not limited by the drawings or embodiments, and various modifications and variations of the present invention may be made without departing from the technical principles and scope specified by the appended claims below.

What is claimed is:

1. A robot controller for controlling an end portion of a multi-degree-of-freedom robot, comprising:
a first control interface which is positioned at a first position around the robot end portion and receives a first control input for at least four directions;
a second control interface which is positioned at a second position around the robot end portion and receives a second control input for at least four directions; and
an encoder which interprets the combination of the first and second control inputs as a third control input about the robot end portion and provides the robot with a signal according to the third control input,
wherein the first control interface and the second control interface are disposed at the positions opposite each other,
wherein, in the 3-dimensional space expressed in terms of x-, y-, and z-axis, when the first and the second control inputs are inputs of the same direction on the same axis, the encoder interprets the control inputs as a translational motion along the input direction to prevent the robot end portion from moving along a direction other than the input direction due to a force applied by a user, and
wherein, in the 3-dimensional space expressed in terms of x-, y-, and z-axis, when the first and the second control inputs are inputs of the opposite direction to each other on the same axis, the encoder interprets the control inputs as a rotational motion about the axis orthogonal to the same axis.

2. The robot controller of claim 1, wherein the signal according to the third control input is a signal instructing a rotational or translational motion corresponding to the third control input, and
wherein the robot excludes an external force not related to the rotational or translational motion corresponding to the third control input among external forces applied to the robot end portion by the signal according to the third control input.

3. The robot controller of claim 1, further comprising a rotating disk for adjusting an angle of the input direction along which the robot end portion makes the translational motion.

4. The robot controller of claim 3, further comprising a motor which provides predetermined rotational resolution when the rotating disk is rotated.

5. The robot controller of claim 4, further comprising a position sensor that senses the position of the motor,
wherein the robot is controlled based on control signal information according to the third control input and position information of the motor through the position sensor.

6. The robot controller of claim 5, further comprising a storage which stores at least one of control signal information according to the third control input and position information of a motor through the position sensor,
wherein direct teaching is performed on the basis of the information stored in the storage.

7. The robot controller of claim 3, wherein the first and the second control interfaces are positioned on the rotating disk.

8. The robot controller of claim 7, wherein the input direction along which the robot end portion makes the translational motion is determined based on the positions of the first and the second control interfaces on the rotating disk.

9. The robot controller of claim 3, wherein the first control interface and the second control interface are disposed on an outer circumferential surface of the rotating disk to be opposite each other.

10. The robot controller of claim 9, further comprising a motor which provides a predetermined rotational resolution when the rotating disk is rotated,
wherein the encoder is disposed over the motor, and
wherein the rotating disk, the motor, and the encoder are coupled to each other to rotate together when the rotating disk is rotated.

11. The robot controller of claim 1, further comprising a fastening member coupling and enclosing the robot end portion and,
wherein the fastening member is coupled to the robot end portion through in a detachable manner.

12. The robot controller of claim 1, wherein at least one of the first and the second control interfaces comprise at least one of a button, switch, joystick, and touch screen for the control input for four directions.

13. The robot controller of claim 12, wherein at least one of the first and the second control interfaces further comprise a button for motion control of an end effector.

14. The robot controller of claim 1, wherein the first and the second control interfaces are disposed being apart from each other within a distance of one-hand control.

15. The robot controller of claim 1, further comprising a controller which provides a control algorithm based on impedance control to prevent a force or moment from being applied to other axis than a first axis, when a control input is applied on the first axis in the 3-dimensional space expressed in terms of x-, y-, and z-axis.

16. The robot controller of claim 15, wherein, when a control input is applied to the plane formed by the first and the second axis in the 3-dimensional space, the control algorithm comprises an algorithm which excludes a force or moment along a third axis other than the force or moment applied on the plane formed by the first and the second axis.

17. The robot controller of claim 15, wherein, when a control input related to rotation of the robot end portion is applied, the control algorithm comprises an algorithm which excludes a force or moment related to the movement of the robot end portion in the 3-dimensional space.

18. A method for controlling a multi-degree-of-freedom robot by using a robot controller, comprising:
receiving a first control input for at least four directions from a first control interface positioned at a first position around a robot end portion;
receiving a second control input for at least four directions from a second control interface positioned at a second position around the robot end portion;
combining the first and the second control input so as to interpret the combined first and the second control input as a third control input about the robot end portion; and
providing the robot with a signal according to the third control input,
wherein, the first control interface and the second control interface are disposed at the positions opposite each other,
wherein, in the 3-dimensional space expressed in terms of x-, y-, and z-axis, when the first and the second control inputs are inputs of the same direction on the same axis, an encoder interprets the control inputs as a translational motion along the input direction to prevent the robot end portion from moving along a direction other than the input direction due to a force applied by a user, and
wherein, in the 3-dimensional space expressed in terms of x-, y-, and z-axis, when the first and the second control inputs are inputs of the opposite direction to each other on the same axis, the encoder interprets the control inputs as a rotational motion about the axis orthogonal to the same axis.

19. A multi-degree-of-freedom robot, comprising:
a robot controller controlling motion of a robot; and
at least one robot arm moving according to the control of the robot controller, wherein the robot controller comprises:
a first control interface which is positioned at a first position around a robot end portion and receives a first control input about at least four directions;
a second control interface which is positioned at a second position around the robot end portion and receives a second control input about at least four directions; and
an encoder which interprets the combination of the first and second control inputs as a third control input about the robot end portion and provides the robot with a signal according to the third control input,
wherein, the first control interface and the second control interface are disposed at the positions opposite each other,
wherein, in the 3-dimensional space expressed in terms of x-, y-, and z-axis, when the first and the second control inputs are inputs of the same direction on the same axis, the encoder interprets the control inputs as a translational motion along the input direction to prevent the robot end portion from moving along a direction other than the input direction due to a force applied by a user,
wherein, in the 3-dimensional space expressed in terms of x-, y-, and z-axis, when the first and the second control inputs are inputs of the opposite direction to each other on the same axis, the encoder interprets the control inputs as a rotational motion about the axis orthogonal to the same axis.

* * * * *